J. GEORGE.
Cultivator.
No. 205,630. Patented July 2, 1878.
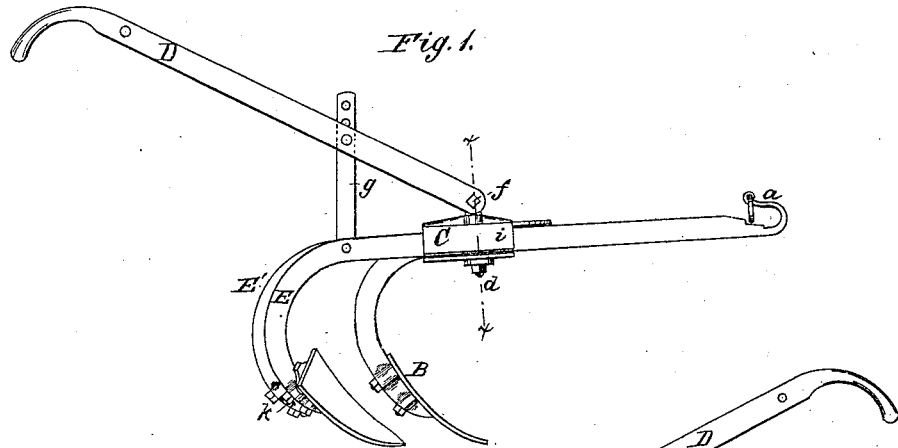
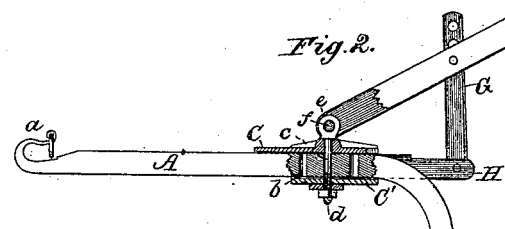
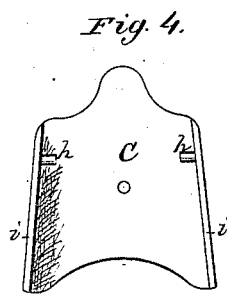
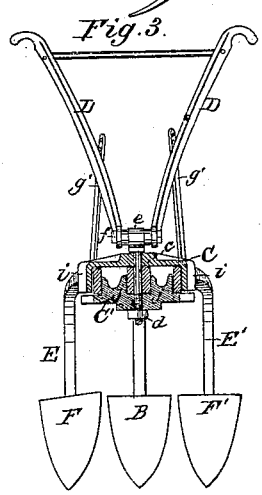
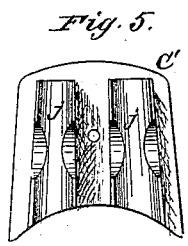
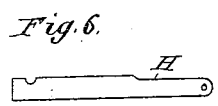
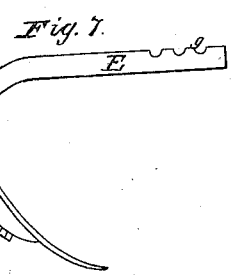
WITNESSES:
W. W. Hollingsworth
Edw. W. Byrn
INVENTOR:
Joseph George
BY
[Attorney signature]
ATTORNEYS.
N. PETERS, PHOTO-LITHOGRAPHER, WASHINGTON, D. C.

UNITED STATES PATENT OFFICE.

JOSEPH GEORGE, OF SPRINGFIELD, MISSOURI.

IMPROVEMENT IN CULTIVATORS.

Specification forming part of Letters Patent No. 205,630, dated July 2, 1878; application filed April 9, 1878.

*To all whom it may concern:*

Be it known that I, JOSEPH GEORGE, of Springfield, in the county of Greene and State of Missouri, have invented a new and Improved Cultivator; and I do hereby declare that the following is a full, clear, and exact description of the same, reference being had to the accompanying drawing, forming part of this specification, in which—

Figure 1 is a side elevation of the cultivator with three shovels. Fig. 2 is a side elevation of the cultivator with one shovel, the clamping device being in section. Fig. 3 is a transverse vertical section through line $x\ x$ of Fig. 1. Figs. 4, 5, 6, 7 are details.

This is an improved form of cultivator or shovel-plow, designed to be convertible into either a single, double, or triple shovel plow, as occasion may require.

It consists in the peculiar construction and arrangement of two detachable clamping-plates, which hold the plow-beams, and their arrangement with respect to the said beams and the handles of the plow, whereby a single bolt is made at the same time to secure the forward ends of the handles and clamp the plates to hold the plow-beams in place, as hereinafter more fully described.

In the drawing, A represents the central plow-beam, which has at its front end a draft attachment, $a$, and at its rear end is bent down to form the shank of the shovel B. Said plow-beam is enlarged near its middle portion, and perforated with several vertical holes, $b$, to admit the passage of the clamping-bolt.

C C' are the clamping-plates, which, when drawn together by the bolt $c$, serve to secure the plow-beam between the same. This bolt $c$ passes centrally through the said plates and the plow-beam, and has upon its under side a nut, $d$, which may be turned upon the threaded portion of the bolt $c$, to either clamp or loosen the plates. Above these plates the bolt-head is perforated to form an eye, $e$, which gives passage to the horizontal bolt $f$, that secures the forward ends of the handles D D; also, two flanges are raised one and one-fourth inch on either side of eyebolt, so as to give passage to said horizontal bolt $f$—both these methods to be used alternately, as may be desired.

E E' are the two short side beams or curved standards for the side shovels F F'. These are provided upon the upper side of their forward ends with notches $g$, which receive lugs $h$, formed upon the upper clamp-plate C, which lugs and notches, when the plates are clamped, effectually prevent any longitudinal movement of the said side beams or standards; or side beams may be provided with holes in front end, forward of clamp-plates, to receive a wooden break-pin when used as a sulky-cultivator, but to receive an iron pin when used as a shovel-plow.

These side standards may be held in place by bending the forward ends of said standards, or by upsetting the same, or in any way enlarging the forward ends of said standards or beams.

G G are vertical bars, which are connected above with the handles and below with the side beams, or their equivalents, as hereinafter described, to support the handles and brace the parts of the cultivator. The upper clamp-plate is provided with flanges $i\ i$ upon the sides, and the lower one is formed with tongues $j\ j$, between which and the flanges $i$ the central beam and the two side standards are held and clamped to form the triple-shovel plow, as shown in Figs. 1 and 3.

To change the device to a double-shovel plow, the bolt $c$ is removed and the central beam A taken out. A plain wooden beam is then substituted for it, and the two side standards and shovels constitute a double-shovel plow.

To use it as a single-shovel plow, the central beam A is replaced and the two side standards E E' are removed. In the place of these side standards two supporting-arms, H H, are substituted. These supporting-standards are notched like the side standards, so as to receive the lugs of the upper plate, and at their rear ends are perforated and bolted to the vertical supports G for the handles, as shown in Fig. 2. When the device is used, therefore, as a single-shovel plow, only the central beam is used, and the supporting-arms sustain the handles in the place of the side shovel-standards.

It will be seen that the central beam is perforated with several holes to receive the bolt, and the side shovel-standards have also several notches in their front upper ends. This permits the shovels to be set farther to the front or rear with relation to the handles, and correspondingly regulates the distance between the shovels. The vertical bars G being also provided with several holes at the top, the handles may be adjusted higher or lower, as may be required.

Upon one of the standards an inclined seat, $k$, is fixed, so as to make the shovel incline to one side and cause it to throw the dirt to whichever side desired. This device adapts the cultivator to receive a scraper or cotton-sweep, as shown in Fig. 1.

Having thus described my invention, what I claim as new is—

1. The combination, with plow-beam A, handles D, and clamping-plates C C', of an eyebolt, $c$, arranged as described, to simultaneously secure the forward ends of the handles and bind together the clamping-plates, substantially as described.

2. The combination of the perforated plow-beam A, the notched side beams or standards E E', the clamp-plate C, having lugs $h$, the clamp-plate C', having tongues $j$, the bolt $c$, handles D, and vertical bars G, attached to the handles above and the side standards below, substantially as described.

3. A bar having its forward end notched to receive the lug of the clamp-plate, combined with the said clamp-plates C C', the vertical bars G, and the handles D, and extending rearwardly from the clamp-plates to support the handles, substantially as described.

JOSEPH GEORGE.

Witnesses:
T. K. O'DAY,
A. W. VOLNER.